Dec. 17, 1963
R. O. ISENBARGER
3,114,579
HUB CAP PLUG VALVE AND ASSEMBLY
Filed May 28, 1962
2 Sheets-Sheet 1
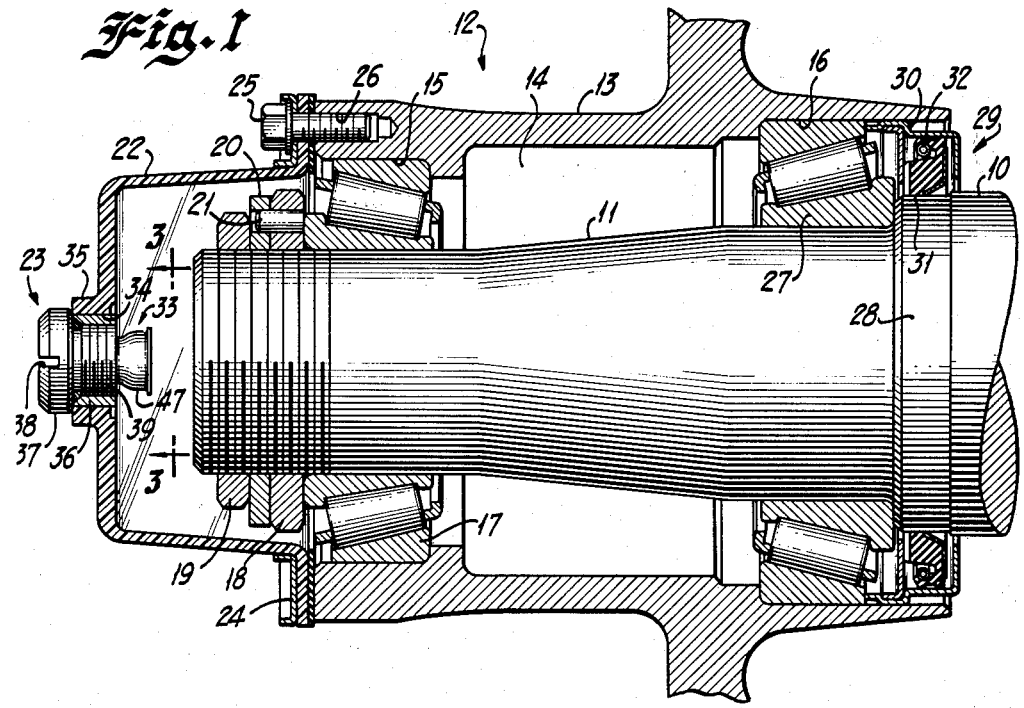
Fig. 1
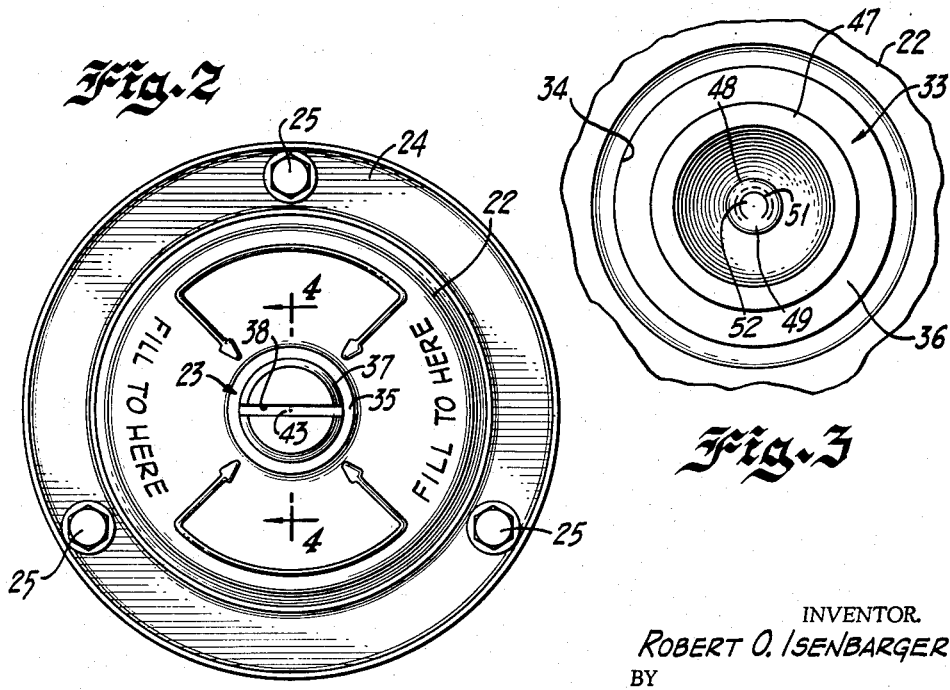
Fig. 2
Fig. 3
INVENTOR.
ROBERT O. ISENBARGER
BY
Cromwell, Greist and Warden
ATTORNEYS Dec. 17, 1963 R. O. ISENBARGER 3,114,579
HUB CAP PLUG VALVE AND ASSEMBLY
Filed May 28, 1962 2 Sheets-Sheet 2
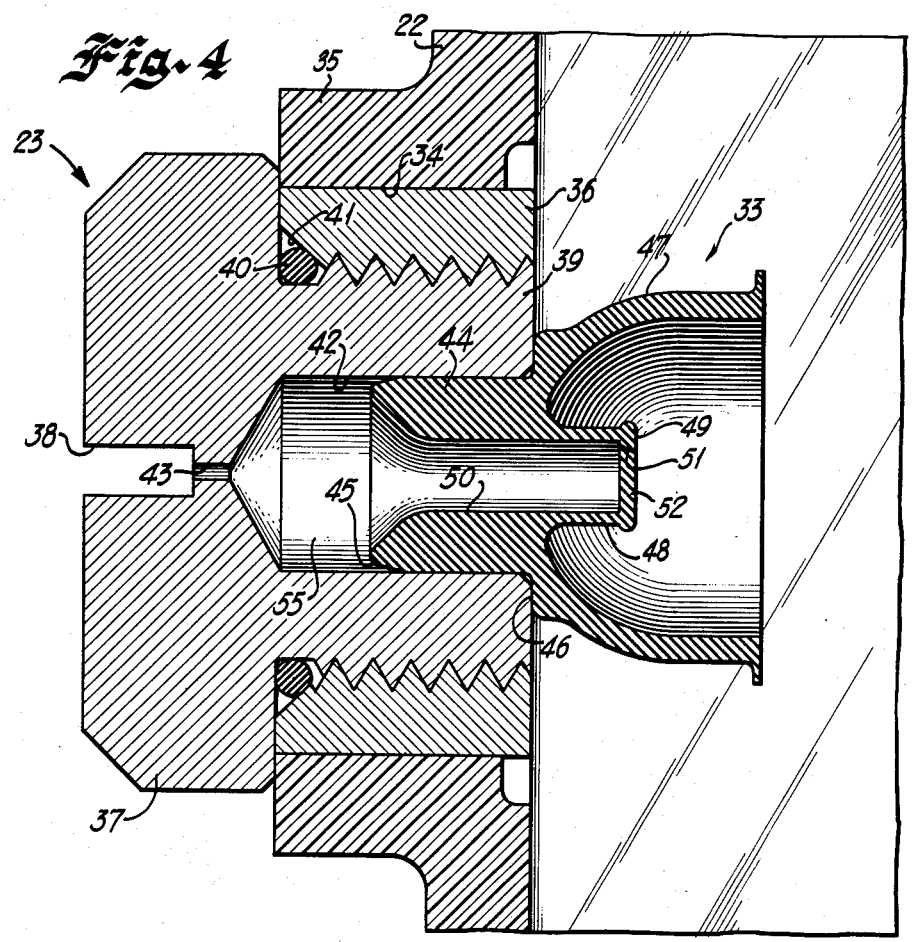
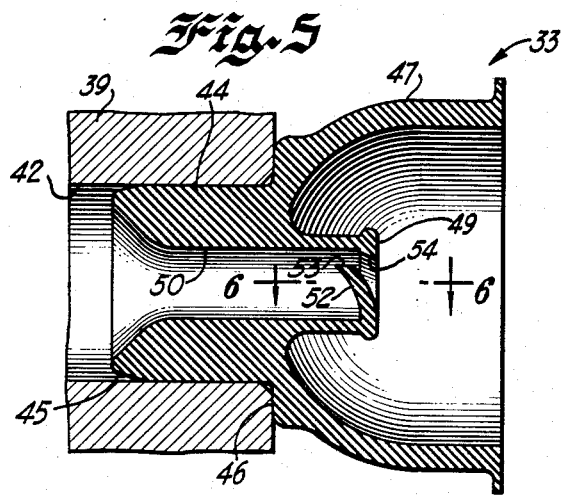
INVENTOR.
ROBERT O. ISENBARGER
BY
Cromwell, Greistand Warden
ATTORNEYS

United States Patent Office 3,114,579
Patented Dec. 17, 1963

3,114,579
HUB CAP PLUG VALVE AND ASSEMBLY
Robert O. Isenbarger, Chicago, Ill., assignor to Chicago Rawhide Manufacturing Co., Chicago, Ill., a corporation of Illinois
Filed May 28, 1962, Ser. No. 198,019
6 Claims. (Cl. 301—108)

This invention relates to a new and improved venting means and assembly for wheel housings, particularly in trailer axle and wheel units, wherein the wheel housing establishes a reservoir for free flowing lubricant. More specifically the invention deals with a special form of plug valve means particularly adapted for hub cap installation as well as a specific assembly including such valve means, the assembly constituting a part of a trailer axle and wheel installation.

Trailer wheel and axle assemblies, especially the assemblies used on large trailers and semi-trailers, basically involve the mounting of a wheel on a fixed axle or spindle for rotation thereabout. The hub of the wheel defines a lubricant reservoir about the end of the spindle in association with the wheel bearings. A quantity of lubricant is maintained in the reservoir or wheel housing to provide a bath-like action. It is often the case that a special transparent hub cap is used to provide means whereby the level of the lubricant in the wheel housing can be readily observed for maintenance purposes.

With installations of this type it has been found desirable to provide a vent means communicating with the wheel housing to provide for pressure equalization. Operation of the trailer results in a heating of the lubricant and with such heating a super-atmospheric pressure is created within the wheel housing. If vent means are formed in the assembly, such as through the hub cap, it has been found that the internal pressure can be relieved thus avoiding interference with lubricant distribution over the bearings. Also with the sudden cooling of the heated lubricant a vacuum may be created internally of the housing which will cause the drawing in of moisture or water particularly when the trailer wheel is immersed in water up to the hub cap. Such immersion is the direct cause of the creation of a vacuum due to the resultant cooling of the lubricant. Water is injurious to the bearings and it has been found that the provision of a mere vent in the form of an unguarded hole is often undesirable particularly in trailers which are used in off the road operations.

It is an object of the invention to provide new and improved plug valve means for hub cap installation, the valve means providing for one-way pressure release while preventing the ingress of foreign matter into the hub cap.

It is a further object to provide a new and improved hub cap assembly including a specially arranged filler opening having as a part thereof the new and improved plug valve means of the invention, the assembly including cooperating means whereby a build up of pressure therein is subject to ready and efficient release and the introduction of foreign matter such as moisture or the like is prevented in the event of the creation of a vacuum in the assembly.

Still a further object is to provide new and improved plug valve means of unique design and arrangement adapted for ready operative installation in a specially arranged hub cap plug, the valve means and plug being of uncomplicated design and providing for efficient pressure equalization in an axle and wheel installation.

Other objects not specifically set forth will become apparent from the following detailed description of the invention made in conjunction with the accompanying drawings wherein:

FIG. 1 is a fragmentary section of a known type of trailer wheel assembly illustrating operative mounting of the plug and plug valve means forming a part of the invention;

FIG. 2 is an end elevation of the hub cap portion of the assembly of FIG. 1;

FIG. 3 is a fragmentary opposite end elevation of the plug and valve means as viewed generally along line 3—3 in FIG. 1;

FIG. 4 is an enlarged fragmentary transverse section of the plug and valve means illustrating the same in operative position in the hub cap and taken generally along line 4—4 in FIG. 2;

FIG. 5 is a fragmentary transverse section of the plug valve means of the invention illustrating operative functioning thereof; and FIG. 6 is a fragmentary longitudinal section of a portion of the plug valve means as viewed generally along line 6—6 in FIG. 5.

A typical trailer wheel assembly is illustrated in FIG. 1. As is well known, such an assembly includes a fixed axle 10 having a spindle 11 forming a part thereof and about which a wheel 12 is received. The wheel 12 includes a hub 13 which internally thereof defines a lubricant housing 14 arranged between a pair of axially aligned, spaced bores 15 and 16. The bore 15 has mounted therein a roller bearing assembly which includes an outer race 17. This bearing assembly is engaged with the outer end of the spindle 11 with the wheel 12 being suitably locked on the axle 10 by a lock nut assembly including nuts 18 and 19 and an intermediate washer 20, the latter being fixedly combined with the nut 18 by a plurality of locking pins 21 of known type. A hub cap 22 encloses the outer end of the bore 15 of the hub 13 and carries a removable filler plug 23 which upon removal permits lubricant filling of the housing 14. Lubricant in the housing 14 is maintained at a prescribed level which is readily observable through the hub cap 22 as this cap is made of transparent plastic material. As shown in FIG. 2, the outer end wall portion of the hub cap 22 is formed with suitable indicia providing an indication as to the proper level of lubricant to be maintained in the assembly. The hub cap 22 is further formed with a peripheral attachment flange 24 receiving therethrough a plurality of fasteners 25 which are threadedly received in recesses 26 formed in the outer radial face of the wheel 12 surrounding the bore 15.

The bore 16 has mounted therein a roller bearing assembly which includes an inner race 27 engaged with the spindle 11. A spindle collar 28 in the form of an enlarged shoulder portion is located immediately outwardly of the roller bearing assembly in the bore 16. A seal assembly 29 of any suitable design is received in the bore 16 and is mounted in sealing engagement on the collar 28. The seal assembly 29 includes a stamping portion 30 which is press fitted in the bore 16. A rubber-like sealing member 31 frictionally engages the collar 28 and is formed with an outwardly pressed sealing lip portion 32 held in running sealing engagement with the stamping portion 30 which rotates with the wheel 12.

Rotation of the wheel 12 about the spindle 11 results in the heating of the lubricant maintained in the housing 14. A temperature rise results in the establishing of a higher pressure in the housing 14 which can interfere with proper distribution of lubricant throughout the bearing assemblies forming a part of the installation. It has been recommended that suitable vent means be provided in the assembly to permit pressure equalization, but vent means used have been in the form of small pin-like openings extending through a suitable part of the hub cap 22. Such openings are undesirable in that lubricant can be lost through the same or the openings can be readily plugged by foreign matter accumulated in the lubricant. Furthermore, it is not unusual for the trailer wheels to be subjected to adverse operating conditions such as being immersed in pools of water, mud or the like. In situations where the heated lubricant is suddenly cooled by being subjected to substantially variant external conditions, a vacuum is created in the wheel housing 14 and foreign matter including undesirable moisture or water or the like is readily drawn through any unguarded vent openings provided in the hub cap 22. Additionally, such unguarded openings are subject to ready plugging under the circumstances outlined.

The present invention deals with the provision of a special plug 23 including special plug valve means 33 removably mounted therein. FIG. 4 best illustrates the structural features of the plug and valve means. The outer end wall of the hub cap 22 centrally thereof is formed with an opening 34 defined by an axially outwardly directed flange portion 35. An internally threaded collar 36 formed from metallic material is suitably fixed in the opening 34. The plug 23 is formed with an enlarged outer end head 37 including a transverse tool receiving slot 38 in the outer surface thereof. An inner shank portion 39 is received in the collar 36 and is provided with external threads for releasable fixing therein. An O-ring 40 is suitably mounted about the shank 39 immediately inwardly of the head 37 and is placed in sealing engagement with a frusto-conical surface portion 41 of the collar 36. In this manner the plug 23 is externally sealed to the collar 36.

The plug shank 39 is formed with an internal axial bore 42 which extends from full communication with the inner end of the shank 39 but terminates adjacent the head 37 thus terminating short of the outer end surface of the plug 23. A small vent passage 43 extends between the outer end of the bore 42 and the base of the tool slot 38 to place the bore 42 in communication with the atmosphere. This arrangement provides for protection of the vent passage 43 against the plugging thereof by foreign matter or the like as the tool slot 38 provides for limited access of foreign matter to the vent passage.

The plug valve means 33 is preferably of one-piece molded configuration formed from rubber or rubber-like material. This means includes a generally cylindrical elongated plug-type body portion 44 which at the outer end surface thereof is formed with a frusto-conical area 45 permitting ready operative insertion of the body portion in the bore 42 of the plug 23. The body portion is frictionally mounted in the bore 42 and the extent to which the same is inserted therein is limited by a circumferentially continuous radially directed shoulder portion 46 formed on the inner end of the body portion. The shoulder portion 46 forms a part of a cup-like shielding means 47 which projects inwardly beyond the inner end of the shank 39 of the plug 23 and substantially axially and radially overextends the innermost end of the body portion 44 of the valve means.

Centrally of the shielding means 47 the body portion 44 of the valve means 33 is formed with an axially projecting tubular valve portion 48 terminating in a transverse membrane portion 49. The body portion 44 including the tubular extension 48 is provided with a central longitudinal passage 50 which is open at the outermost end of the body portion and which is closed off at the opposite end by the transverse membrane 49. As best shown in FIGS. 3 and 6, the membrane 49 centrally thereof is provided with a circular slit 51 located within the confines of the passage 50. The slit 51 is not circumferentially continuous but is interrupted by a base connecting area thus defining a flexible valve flap 52 which is integrally formed with the remainder of the membrane 49. The rubber-like material of the membrane 49 is readily flexible thus providing the valve flap 52 with adequate resiliency to operate in response to differential pressures. The slit 51 forming the valve flap 52 is directed at an angle to establish flap and membrane engaging edges 53 and 54 (FIG. 5) which are cooperatively cone-shaped to provide for one-way operation of the valve means.

The closed position of the flap 52 of the valve means 33 is illustrated in FIG. 4. It will be noted that in the event that an external pressure greater than the internal pressure of the wheel housing 14 will not be effective in forcing foreign matter into the oil reservoir area. The engagement of the complementary cone-shaped surfaces 53 and 54 between the flap and surrounding membrane portion will prevent inward bending of the flap 52 into a position opening the passage 50. As illustrated, the plug valve means 33 is dimensioned to be only partially inserted in the plug bore 42 thus providing a rather substantial area 55 (FIG. 4) in which foreign solid material such as dirt or the like may accumulate in the event that the same is introduced through the guarded vent 43 by greater external pressure. In this respect it will be appreciated that the possibility of the vent 43 becoming clogged is minimized as any foreign solids forced therethrough will be quite readily accumulated in the bore area 55. Furthermore, foreign material introduction is substantially prevented by communication of the vent 43 with the tool slot 38.

Assuming the development of an increase in pressure within the wheel housing 14 as a result of operation of the trailer, the increment of pressure which is greater than atmospheric pressure will be effective against the valve flap 52 to bend the same outwardly into the position shown in FIGS. 5 and 6. In this manner the compressed air or other gases will bleed outwardly through the passage 50, bore 42 and vent 43. The greater diameter of the passage 50 as compared with the diameter of the vent 43 will also provide for a build up in pressure at the vent 43 during bleeding thus aiding in maintaining the vent 43 free of solids which might tend to block the same. The inherent resiliency of the material from which the flap 52 is formed will provide for immediate return of the same into the valve closing position upon adequate pressure equalization.

In the event of vacuum formation in the wheel housing 14 as a result of sudden cooling of the heated lubricant such as by the immersion of the wheel 12 in a pool of water or in snow or the like, foreign material cannot be drawn into the wheel housing as a result of the pressure differential because of the retention of the valve flap 52 in its closed position as described above. During operative use of the assembly described the bell or cup-shaped shielding means 47 protects the valve flap 52 from the forces of circulating lubricant in the wheel housing 14. The shielding means 47 substantially overextends the membrane 49 radially and axially within the hub cap 22 and lubricant is guttered away from the membrane.

Obviously certain modifications and variations of the invention as hereinbefore set forth may be made without departing from the spirit and scope thereof, and therefore only such limitations should be imposed as are indicated in the appended claims.

I claim:

1. Plug valve means for hub cap installation, said valve means comprising an elongated cylindrical plug-type body portion provided with a longitudinal passage open at one end and closed at the other end by a transverse membrane, said membrane being formed from resilient readily flexible material and provided with a slit directed to define a valve flap operative into said passage in the open position thereof, said flap in the closed position being operative to seal off said other end of said passage, said flap and membrane having engaging edges which are cooperatively cone-shaped to provide for one-way operation of said valve means, and cup-shaped shielding means having a base portion formed integrally with said body portion inwardly of said other end and extending radially and axially outwardly of and surrounding said other end, said other end of said body portion including said membrane projecting substantially outwardly from the base portion of said shielding means while remaining protectively confined therein.

2. A hub cap comprising a filler opening having removably received therein a plug, said plug including an axial bore extending from the inner end thereof and terminating short of the outer end thereof, a vent passage extending between said bore and the outer end of said plug, and valve means including an elongated plug-type body portion mounted in said bore, said body portion being provided with a longitudinal passage open at one end and closed at the other end by a transverse membrane, said membrane being formed from resilient readily flexible material and provided with a slit centrally thereof within the confines of said passage, said slit being directed to define a valve flap operative into said passage into the open position thereof, said flap in the closed position being operative to seal off said other end of said passage, said flap and membrane having engaging edges which are cooperatively cone-shaped to provide for one-way operation of said valve means, and cup-shaped shielding means having a base portion formed integrally with said body portion inwardly of said other end and extending radially and axially outwardly of and surrounding said other end, said other end of said body portion including said membrane projecting substantially outwardly from the base portion of said shielding means while remaining protectively confined therein, said shielding means being located outwardly of said bore.

3. The hub cap of claim 2 wherein said shielding means includes with an outer surface portion defining shoulder means in engagement with the inner end of said plug to limit the extent to which said body portion is received in said bore.

4. A hub cap comprising a filler opening having removably received therein a plug, said plug including an axial bore extending from the inner end thereof and terminating short of the outer end thereof, the outer end of said plug including a transverse slot for tool application, a vent passage extending between said bore and the outer end of said plug and located in said slot, said vent passage being of substantially smaller diameter than the diameter of said bore, and valve means including a cylindrical body portion mounted in said bore but spaced substantially from the termination of said bore to provide a large accumulation chamber, said body portion being provided with a longitudinal passage open at one end and closed at the other end by a transverse membrane, said membrane being formed from resilient readily flexible material and provided with a slit centrally thereof within the confines of said passage, said slit being directed to define a valve flap operative into said passage in the open position thereof, said flap in the closed position being operative to seal off said other end of said passage, said flap and membrane having engaging edges which are cooperatively cone-shaped to provide for one-way operation of said valve means, and shielding means surrounding said other end of said body portion and projecting outwardly therefrom about said membrane, said shielding means being located outwardly of said bore.

5. The hub cap of claim 4 wherein said shielding means includes an outer surface portion defining shoulder means in engagement with the inner end of said plug to limit the extent to which said body portion is received in said bore, said one end of the body portion of said valve means being tapered to permit ready reception thereof in said bore.

6. A hub cap comprising a filler opening having removably received therein a plug, said plug including an axial bore extending from the inner end thereof and terminating short of the outer end thereof, the outer end of said plug including a transverse slot for tool application, a vent passage extending between said bore and the outer end of said plug and located in said slot, said vent passage being of substantially smaller diameter than the diameter of said bore, and valve means including a cylindrical body portion mounted in said bore but spaced substantially from the termination of said bore to provide a large accumulation chamber, said body portion being provided with a longitudinal passage open at one end and closed at the other end by a transverse membrane, said membrane being formed from resilient readily flexible material and provided with a slit centrally thereof within the confines of said passage, said slit being directed to define a valve flap operative into said passage in the open position thereof, said flap in the closed position being operative to seal off said other end of said passage, said flap and membrane having engaging edges which are cooperatively cone-shaped to provide for one-way operation of said valve means, and cup-shaped shielding means having a base portion formed integrally with said body portion inwardly of said other end and extending radially and axially outwardly of and surrounding said other end, said other end of said body portion including said membrane projecting substantially outwardly from the base portion of said shielding means while remaining protectively confined therein, said shielding means being located outwardly of said bore.

References Cited in the file of this patent

UNITED STATES PATENTS

| | | |
|---|---|---|
| 670,794 | Lott | Mar. 26, 1901 |
| 2,321,236 | Parkin | June 8, 1943 |
| 2,657,104 | Kayser | Oct. 27, 1953 |
| 2,854,287 | Stephens | Sept. 30, 1958 |
| 2,856,025 | Whited | Oct. 14, 1958 |
| 2,973,230 | Eastburg | Feb. 28, 1961 |
| 3,003,834 | Rendleton | Oct. 10, 1961 |